United States Patent Office 3,274,051
Patented Sept. 20, 1966

3,274,051
METHODS FOR KILLING PLANT FUNGI
Masaru Kado, Takeo Tsuboi, and Taizo Maeda, Shimizu, and Eiichi Yoshinaga, Ogasa-gun, Japan, assignors to Ihara Chemicals Company Limited, Shimizu, Japan, a corporation of Japan
No Drawing. Filed July 27, 1964, Ser. No. 385,489
Claims priority, application Japan, Aug. 30, 1963, 38/45,411; Feb. 5, 1964, 39/5,692
1 Claim. (Cl. 167—30)

This invention relates to a fungicidal composition for agricultural and horticultural purposes for preventing plant diseases, such as rice blast (*Piricularia oryzae*), and sheath blight (*Pellicularia sasakii*) by applying it to the place where the growth of disease is anticipated, and preventing its growth previously or destroying therapeutically by applying it to the place where the disease had occurred.

For preventing the rice blast (*Piricularia oryzae*), sheath blight (*Pellicularia sasakii*) which are main diseases of paddy field rice plant several kinds of organo mercuric fungicides mainly phenyl mercuric acetate and organo arsenic fungicide respectively have heretofore been used. Such known fungicides, however, contain metal or metals of metal compound which remains in hull after the fungicide was dispersed so that it may be harmful to the health of people taking rice as normal food.

The compositions of the invention, however, do not contain metal so that there is absolutely no danger of causing chronic poison to human body and moreover, have exceedingly excellent fungicidal activity.

The compounds constituting the active ingredient of the fungicidal composition of the invention are exemplified as follows:

(1) S-benzyl-O.O-diethylthiolophosphate
(2) S-(o-chlorobenzyl)O.O-diethylthiolophosphate
(3) S-(o-bromobenzyl)O.O-diethylthiolophosphate
(4) S-(m-bromobenzyl)O.O-diethylthiolophosphate
(5) S-(p-chlorobenzyl)O.O-diethylthiolophosphate
(6) S-(3,4-dichlorobenzyl)O.O-dimethylthiolophosphate
(7) S-(3,4-dichlorobenzyl)O.O-diethylthiolophosphate
(8) S-(2,6-dichlorobenzyl)O.O-diethylthiolophosphate
(9) S-(p-bromobenzyl)O.O-diethylthiolophosphate
(10) S-(3,4-dibromobenzyl)O.O-diethylthiolophosphate
(11) S-benzyl-O.O-dimethyldithiophosphate
(12) S-(p-chlorobenzyl)O.O-dimethyldithiophosphate
(13) S-(m-nitrobenzyl)O.O-dimethyldithiophosphate
(14) S-(p-nitrobenzyl)O.O-dimethyldithiophosphate
(15) S-benzyl-O.O-diethyldithiophosphate
(16) S-(o-chlorobenzyl)O.O-diethyldithiophosphate
(17) S-(m-chlorobenzyl)O.O-diethyldithiophosphate
(18) S-(p-chlorobenzyl)O.O-diethyldithiophosphate
(19) S-(3,4-dichlorobenzyl)O.O-diethyldithiophosphate
(20) S-(2,6-dichlorobenzyl)O.O-diethyldithiophosphate
(21) S-(o-nitrobenzyl)O.O-diethyldithiophosphate
(22) S-(m-nitrobenzyl)O.O-diethyldithiophosphate
(23) S-(p-nitrobenzyl)O.O-diethyldithiophosphate
(24) S-(4-bromo - 2-nitrobenzyl)O.O-diethylthiolophosphate
(25) S-(4-bromo - 3-nitrobenzyl)O.O-diethylthiolophosphate
(26) S-(4-chloro - 2-nitrobenzyl)O.O-diethyldithiophosphate
(27) S-(4-chloro-2-nitrobenzyl)O.O-dimethyldithiophosphate
(28) S-(4-nitro - 2-chlorobenzyl)O.O-diethyldithiophosphate
(29) S-(4-chloro - 2-nitrobenzyl)O.O-diethylthiolophosphate
(30) S-(4-chloro - 3-nitrobenzyl)O.O-diethylthiolophosphate The fungicidal compositions for agricultural and horticultural purposes according to the invention may have the form of dust, wettable powder or emulsifier concentrate and may be manufactured by the following methods respectively and obtained as a mixture with carrier.

The "carrier" in the specification means a carrying or bearing body to be used for carrying active ingredient to a desired place and may be of solid or liquid, that is, the solid carriers are fine powders of clay, pyrophyllite, talc, diatomaceous earth, silica, vermiculite, calcium carbonate, are mixed with the active ingredient of the invention and crushed into dust. Further wettable spreader and surfactant such as sodium lignin sulfonate, sodium dinaphthyl methane disulfonate or corresponding ammonium salts or calcium salts, octylphenyl polyoxyethyl ether and the like alkyl polyoxy ether may be added and the mixture is crushed to provide wettable powder.

Liquid carrier are solvents for the active ingredient of the invention and non-solvent which can disperse or dissolve active ingredient by means of an auxiliary agent, for instance, water, benzene, kerosene, alcohol, acetone, methyl naphthalene, cyclohexanone, animal and vegetable oils and aliphatic ester and surfactants and the like liquid carrier may be mixed and stirred to manufacture an emulsifier.

In using the compositions of the invention, in case of powder material, it can be directly dusted on the leaves or stems of plants, and in case of emulsifier concentrate, it can be diluted with water etc. to a suitable concentration and may be applied on leaves and stems of plants by spraying it with a sprayer and in case of wettable powders they can be applied by spraying as a suspension of a suitable concentration with water.

It is of course desirable to expect positive effect by mixing surfactant such as spreader, emulsifier, wettable spreader, sticker which are usually used as an auxiliary agent for spreading the fungicide. Moreover, the fungicides of the invention may be used in mixture with insecticide, such as, BHC, parathion, fungicides such as various kinds of organo sulfur compounds, copper compounds, mercuric compounds or plant growth regulants, such as 2-4-D or fertilizers.

The method of manufacturing the compositions of the invention and also the manner of using the same will be explained in the following examples:

It should be noted that the additives and active ingredients may be changed over a wide range.

*Example 1.—Method of manufacturing dusts and manner of using same*

A mixture of 2% of S-(3,4-dichlorobenzyl)O.O-diethylthiolophosphate and 98% of diatomaceous earth—Dicrite (trademark of Dicrite Kagaku Kogyo Co., Ltd., kaolin system) was pulverized to manufacture the dusts.

The powder may be directly dusted by means of a duster on the spots where rice blast (*Piricularia oryzae*) or sheath blight (*Pellicularia sasakii*) have been infected to destroy the disease.

*Example 2.—Method of manufacturing dusts and manner of using same*

A mixture of 5% of S-benzyl-O.O-dimethylthiolophosphate and 95% of diatomaceous earth, pyrophyllite mixture was pulverized to make the dust and it was used in the same manner as in Example 1.

*Example 3.—Method of manufacturing wettable powder and manner of its use*

A mixture of 15% of S-(p-chlorobenzyl)O.O-diethylthiolophosphate, 80% of diatomaceous earth—kaolin mixture and 5% of spreader—Emale (trademark of Kao Soap Co., Ltd.) was pulverized to make the wettable powder.

In case of using the wettable powder was suspended in water and sprayed on the leaves and stems of paddy field rice plant infected by rice blast (*Piricularia oryzae*) to destroy the disease.

*Example 4.—Method of manufacturing emulsion type wettable powder and its use*

15% of S-(p-nitrobenzyl)O.O-dimethyldithiophosphate and 5% of emulsifier, Solpole (trademark of Toho Kagaku Kogyo Co., Ltd.) were mixed and dissolved, then the mixture was adsorped by 80% of diatomaceous earth—Dicrite (trademark of Dicrite Kakaku Kogyo Co., Ltd., kaolin system). In case of using it was diluted with water to a suitable concentration and sprayed as suspension liquid.

*Example 5.—Method of manufacturing emulsifier and its use*

80% of S-(o-nitrobenzyl)O.O-diethyldithiophosphate and 20% of emulsifier Solpole (trademark of Toho Kagaku Kogyo Co., Ltd.) were mixed and dissolved to make an emulsifier concentrate. It was diluted with water to be used as spraying liquid.

*Example 6.—Method of manufacturing emulsifier concentrate and its manner of using*

40% xylene, and 10% emulsifier, Kalgen (trademark of Takemoto Yushi Co., Ltd. (were mixed to 50% of S-(p-chlorobenzyl)O.O-diethylthiolophosphate and dissolved purposes according to the invention against the pathogenic organism.

(a) *Anti-microbial spectrum by the agar dilution method (Misato's modified method).*—Aqueous dilution liquid of the composition of the invention in the formulation of emulsifier was mixed to the agar cultivation group and flowed into a Petri dish of 9 cm. in diameter to solidify to make the concentrations of the effective ingredients 1, 10 and 100 p.p.m. To each of the agars was inoculated pathogenic organisms and left for 3 days at 28° C., then the growths of the fungi was inspected and the concentration the compounds for preventing of the growth of the test organisms was expressed in p.p.m. unit.

(b) *Inspection of spore germination LD—90 by Petri dish process.*—A definite quantity of acetone solution of each medicine was dropped in a small Petri dish (inner diameter of 4.2 cm.) and the solvent was dried out at room temperature.

After drying, for the sake of accelerating the germination of spore 5 ml. of Hopkin's nourishing liquid and 1 ml. of suspension liquid having fungi spore of rice blast (*Piricularia oryzae*) were added and after the spores were uniformly distributed in the Petri dish it was placed in a thermostatic container at 28° C. and left for 24 hours, then tested by a microscope.

The active ingredient ($\mu g./cm.^2$) showing 90% suppressing rate of spore germination was settled as LD–90 of active ingredient.

| Name of active ingredient | Agar dilution method (p.p.m.) | | | | | | | H |
| --- | --- | --- | --- | --- | --- | --- | --- | --- |
| | A | B | C | D | E | F | G | LD-90 [1] ($\mu g./cm.^2$) |
| S-benzyl-O.-O-diethylthiolophosphate | 100 | 100 | 100 | 10 | 100 | 100 | 100 | 5.0 |
| S-(o-chlorobenzyl)O.O-diethylthiolophosphate | 100 | 10 | 100 | 10 | 100 | 100 | 100 | 8.1 |
| S-(p-chlorobenzyl)O.O-diethylthiolophosphate | 10 | 10 | 100 | 10 | 100 | 100 | 100 | 7.5 |
| S-(3, 4-dichlorobenzyl)O.O-diethylthiolophosphate | 10 | 10 | 100 | 10 | 100 | 100 | 100 | 3.7 |
| S-(o-brombenzyl)O.O-diethylthiolophosphate | 10 | 10 | 100 | 10 | 100 | 100 | 100 | 8.7 |
| S-benzyl-O.O-dimethyldithiophosphate | 10 | 10 | 100 | 10 | 100 | 100 | 100 | 2.0 |
| S-(p-chlorobenzyl)O.O-dimethyldithiophosphate | 100 | 10 | 100 | 10 | 100 | 100 | 100 | 3.2 |
| S-(p-nitrobenzyl)O.O-dimethyldithiophosphate | 10 | 10 | 100 | 10 | 100 | 100 | 100 | 3.3 |
| S-benzyl-O.O-diethyldithiophosphate | 10 | 10 | 100 | 10 | 10 | 100 | 100 | 1.3 |
| S-(m-chlorobenzyl)O.O-diethyldithiophosphate | 10 | 10 | 100 | 1 | 10 | 100 | 100 | 0.90 |
| S-(p-chlorobenzyl)O.O-diethyldithiophosphate | 10 | 10 | 100 | 1 | 10 | 100 | 100 | 1.1 |
| S-(2, 6-dichlorobenzyl)O.O-diethyldithiophosphate | 10 | 10 | 10 | 1 | 10 | 100 | 100 | 1.3 |
| S-(o-nitrobenzyl)-O.O-diethyldithiophosphate | 10 | 10 | 10 | 1 | 10 | 100 | 100 | 0.37 |
| S-(m-nitrobenzyl))O.O-diethyldithiophosphate | 10 | 10 | 10 | 1 | 10 | 100 | 100 | 0.95 |
| S-(4-chloro-2-nitrobenzyl)O.O-dimethyldithiophosphate | 10 | 10 | 10 | 1 | 10 | 10 | 10 | 1.3 |
| S-(4-nitro-2-chlorobenzyl)O.O-diethyldithiophosphate | >100 | >100 | >100 | 100 | >100 | >100 | 100 | 7.3 |
| S-(4-chloro-2-nitrobenzyl)O.O-diethylthiolophosphate | 100 | 100 | 100 | 10 | 100 | 100 | 100 | 3.7 |
| S-(4-bromo-3-nitrobenzyl)O.O-diethylthiolophosphate | 10 | 10 | 10 | 10 | 100 | 10 | 10 | 2.8 |
| Zineb (Trademark of Rohm and Haas Co.) (Standard medicine) | 100 | 10 | 100 | 10 | >100 | >100 | 100 | 0.72 |

[1] The active ingredient ($\mu g./cm.^2$) of 90% suppressing rate of spore germination.

NOTE.—
A: Helminthosporium leaf spot (*Cochliobolus miyabe anus*).
B: Melanose (*Phomopusis citri*).
C: Anthracnose (*Gloeosporium lacticolol*).
D: Rice blast (*Piricularia oryzae*).
E: Black spot (*Alternaria kikuchiana*).
F: Fusarium wilt (*Fusarium oxysporium* f. *niveum*).
G: Bacterial leaf blight (*Xanthomonas oryzae*).
H: Rice blast (*Piricularia oryzae*).

therein to produce the emulsifier concentrate. The emulsifier concentrate was diluted with water to emulsion and used as a spraying liquid.

The results of fungicidal tests of the compositions according to the invention for various kinds of pathogenic organism will be explained in the following:

*Experimental Example 1*

The fungicidal test of the effective ingredients of the fungicidal compositions for agricultural and horticultural

*Experimental Example 2*

Determination of activity of inhibition to infection of sheath blight (*Pellicularia sasakii*) to paddy field rice plant.

First young leaf of cowpea was immersed into a liquid of the composition of the invention in the form of emulsifier diluted with water and after treated thereby it was air dried. Fungi series of sheath blight (*Pellicularia sasakii*) previously cultivated on a plane medium was punched together with agar by a cork holer of 7 mm. in diameter and maintained in thermostatic container at 28° C. for 2 days placing inoculation source. By examining infected area the inhibition value was calculated.

The inhibition value (percent) = (the rate of infected area of untreated leaf — the rate of infected area of treated leaf) ÷ (the rate of infected area of untreated leaf) × 100.

| Name of active ingredient | A | B (p.p.m.) | C (Percent) |
|---|---|---|---|
| S-(o-chlorobenzyl)O.O-diethyl-thiolophosphate | 150 | 1,000 | 89 |
|  | 300 | 500 | 62 |
| S-(3,4-dichlorobenzyl)O.O-diethyl-thiolophosphate | 150 | 1,000 | 87 |
|  | 300 | 500 | 70 |
| S-(p-bromobenzyl)O.O-diethyl-thiolophosphate | 150 | 1,000 | 86 |
|  | 300 | 500 | 72 |
| S-(3,4-dibromobenzyl)O.O-diethyl-thiolophosphate | 150 | 1,000 | 82 |
|  | 300 | 500 | 70 |
| S-(2,6-dichlorobenzyl)O.O-diethyl-thiolophosphate | 150 | 1,000 | 92 |
|  | 300 | 500 | 78 |
| S-(p-nitrobenzyl)O.O-dimethyl-dithiophosphate | 150 | 1,000 | 82 |
|  | 300 | 500 | 68 |
| S-(p-chlorobenzyl)O.O-diethyl-dithiophosphate | 150 | 1,000 | 90 |
|  | 300 | 500 | 82 |
| S-(3,4-dichlorobenzyl)O.O-diethyl-dithiophosphate | 150 | 1,000 | 95 |
|  | 300 | 500 | 90 |
| S-(m-nitrobenzyl)O.O-diethyl-dithiophosphate | 150 | 1,000 | 100 |
|  | 300 | 500 | 87 |
| S-(p-nitrobenzyl)O.O-diethyl-dithiophosphate | 150 | 1,000 | 100 |
|  | 300 | 500 | 87 |
| S-(4-chloro-2-nitrobenzyl)O.O-diethyl-dithiophosphate | 150 | 1,000 | 82 |
|  | 300 | 500 | 60 |
| Ferric methyl arsonate (Standard medicine) |  | 200 | 97 |
|  |  | 100 | 82 |

NOTE.—
A: Dilution rate.
B: Concentration of effective ingredient.
C: Inhibition value.

*Experimental Example 3.*—Test for destroying rice blast (Piricularia oryzae) by emulsifier concentrate Paddy field rice plant (species, *Aichi asahi*) was directly seeded and planted and at its three leaves period the composition of the invention in the form of emulsifier same as that manufactured in the same manner as in Example 5 was diluted with water and sprayed on the leaves and on the next day a liquid suspended with spores of fungi of rice blast (*Piricularia oryzae*) taken from the diseased leaves was inoculated by spraying. After one week of the inoculation the number of diseased spots on the main leaf (the third leaf) were examined.

| Name of active ingredient | A | B (p.p.m.) | C |
|---|---|---|---|
| S-(p-chlorobenzyl)O.O-diethylthiolophosphate | 150 | 1,000 | 23 |
|  | 300 | 500 | 55 |
| S-(3,4-dichlorobenzyl)O.O-dimethylthiolophosphate | 150 | 1,000 | 45 |
|  | 300 | 500 | 71 |
| S-(p-bromobenzyl)O.O-diethylthiolophosphate | 150 | 1,000 | 21 |
|  | 300 | 500 | 38 |
| S-(3,4-dibromobenzyl)O.O-diethylthiolophosphate | 150 | 1,000 | 25 |
|  | 300 | 500 | 28 |
| S-(m-bromobenzyl)O.O-diethylthiolophosphate | 150 | 1,000 | 10 |
|  | 300 | 500 | 16 |
| S-(p-nitrobenzyl)O.O-dimethyldithiophosphate | 150 | 1,000 | 47 |
|  | 300 | 500 | 51 |
| S-(m-chlorobenzyl)O.O-diethyldithiophosphate | 150 | 1,000 | 7 |
|  | 300 | 500 | 15 |
| S-(3,4-dichlorobenzyl)O.O-diethyldithiophosphate | 150 | 1,000 | 5 |
|  | 300 | 500 | 10 |
| S-(m-nitrobenzyl)O.O-diethyldithiophosphate | 150 | 1,000 | 2 |
|  | 300 | 500 | 5 |
| S-(4-chloro-2-nitrobenzyl)O.O-dimethyl dithiophosphate | 150 | 1,000 | 22 |
|  | 300 | 500 | 35 |
| S-(4-chloro-2-nitrobenzyl)O.O-diethylthiolophosphate | 150 | 1,000 | 35 |
|  | 300 | 500 | 53 |
| Non-dispersion |  |  | 215 |

NOTE.—
A: Dilution rate.
B: Concentration.
C: Number of diseased spot per 10 leaves (average).

*Experimental Example 4.*—Test for destroying rice blast (Piricularia oryzae)

Paddy field rice plant (species, *Aichi asahi*) was directly seeded and cultivated and at its three leaves period the composition of the invention in the form of dust same as that manufactured in the same manner as in Example 1 was dusted on the leaves. On the next day, a liquid suspended with spores of fungi of rice blast (*Piricularia oryzae*) taken from the infected leaves was inoculated by spraying. After one week of the inoculation the number of diseased spots on the main leaf (the third leaf) were examined.

| Name of active ingredient | B (percent) | C |
|---|---|---|
| S-(p-chlorobenzyl)O.O-diethylthiolophosphate | 2 | 11 |
| S-(3,4-dichlorobenzyl)O.O-dimethylthiolophosphate | 2 | 18 |
| S-(m-bromobenzyl)O.O-diethylthiolophosphate | 2 | 3 |
| S-(m-nitrobenzyl)O.O-dimethyldithiophosphate | 2 | 4 |
| S-(4-chloro-2-nitrobenzyl)O.O-dimethyldithiolophosphate | 2 | 10 |
| S-(4-chloro-2-nitrobenzyl)O.O-diethylthiolophosphate | 2 | 1.6 |
| S-(4-chloro-3-nitrobenzyl)O.O-diethylthiolophosphate | 2 | 12 |
| S-(4-bromo-2-nitrobenzyl)O.O-diethylthiolophosphate | 2 | 20 |
| Non-dispersion |  | 215 |

NOTE.—
B: Concentration.
C: Number of diseased spots per average 10 leaves.

*Experimental Example 5.*—Test of destroying rice blast (Piricularia oryzae) by wettable powder fungicide Paddy field rice plant (species, *Aichi asahi*) was directly seeded and cultivated and its three leaves period the composition of the invention in the form of wettable powder same as that manufactured in Example 3 suspended in water was sprayed on the leaves by means of a sprayer.

On the next day, a liquid suspended with spore of fungi of rice blast (*Piricularia oryzae*) taken from the diseased leaves was inoculated by spraying. After one week of the inoculation the number of diseased spots on the main leaf (the third leaf) were examined.

| Name of active ingredient | A | B (p.p.m.) | C |
|---|---|---|---|
| S-(p-chlorobenzyl)O.O-diethylthiolophosphate | 150 | 1,000 | 21 |
|  | 300 | 500 | 42 |
| S-(3,4-dichlorobenzyl)O.O-dimethylthilophosphate | 150 | 1,000 | 42 |
|  | 300 | 500 | 65 |
| S-(o-chlorobenzyl)O.O-dimethylthiolophosphate | 150 | 1,000 | 25 |
|  | 300 | 500 | 31 |
| S-(3,4-dichlorobenzyl)O.O-diethylthiolophosphate | 150 | 1,000 | 21 |
|  | 300 | 500 | 29 |
| S-(4-chloro-2-nitrobenxyl)O.O-diethylthiolophosphate | 150 | 1,000 | 31 |
|  | 300 | 500 | 48 |
| S-(o-chlorobenzyl)O.O-diethyldithiophosphate | 150 | 1,000 | 26 |
|  | 300 | 500 | 39 |
| Non-dispersion |  |  | 215 |

NOTE.—
A: Dilution rate.
B: Concentration.
C: Number of diseased spots per average 10 leaves.

What we claim is:
Method of killing plant fungi comprising applying thereto S-benzyl-O.O-diethylthiolophosphate.

References Cited by the Examiner

UNITED STATES PATENTS

| 1,589,675 | 3/1952 | Cook et al. | 260—461.112 |
| 2,609,383 | 9/1952 | Craig | 260—461.112 |
| 2,862,017 | 11/1958 | Schrader et al. | 260—461.112 |
| 3,156,718 | 11/1964 | Lorenz et al. | 260—461 |

LEWIS GOTTS, *Primary Examiner.*

SHEP K. ROSE, *Assistant Examiner.*